(12) United States Patent
Shiau et al.

(10) Patent No.: US 6,285,240 B1
(45) Date of Patent: Sep. 4, 2001

(54) LOW THRESHOLD MOS TWO PHASE NEGATIVE CHARGE PUMP

(75) Inventors: Tzing-Huei Shiau, Hsin-Pu; Yu-Shen Lin, Taipei, both of (TW); Ray-Lin Wan, Fremont, CA (US)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 09/381,066

(22) PCT Filed: Jan. 14, 1999

(86) PCT No.: PCT/US99/00763

§ 371 Date: Sep. 10, 1999

§ 102(e) Date: Sep. 10, 1999

(87) PCT Pub. No.: WO00/42483

PCT Pub. Date: Jul. 20, 2000

(51) Int. Cl.⁷ .......................................................... G05F 1/10
(52) U.S. Cl. .......................... 327/536; 257/368; 257/372; 257/544
(58) Field of Search .................................. 257/368, 544, 257/372; 327/534, 535, 536, 537

(56) References Cited

U.S. PATENT DOCUMENTS

| | | | |
|---|---|---|---|
| 4,857,984 | * 8/1989 | Lucas | 357/41 |
| 5,488,247 | * 1/1996 | Sakurai | 257/368 |
| 5,489,870 | 2/1996 | Arakawa | 327/536 |
| 5,502,629 | 3/1996 | Ito et al. | 363/60 |
| 5,612,921 | 3/1997 | Chang et al. | 365/226 |
| 5,821,805 | 10/1998 | Jinbo | 327/537 |
| 6,100,557 | * 8/2000 | Hung et al. | 257/299 |
| 6,111,282 | * 8/2000 | Gonzalez | 257/299 |
| 6,111,294 | * 8/2000 | Strenz | 257/351 |
| 6,130,574 | * 10/2000 | Bloch et al. | 327/536 |

OTHER PUBLICATIONS

International Application Published under the Patent Cooperation Treaty (PCT): International Publication No.: WO 98/16010, International Publication Date: Apr. 16, 1998, International Application No.: PCT/US96/16317, International Filing Date: Oct. 10, 1996, Applicant: Macronix International Co., Ltd.

Ki–Hwan Choi et al., "Floating–Well Charge Pump Circuits for Sub–2.0V Power Supply Flash Memories," 1997 Symposium on VLSI Circuits Digest of Technical Papers, pp. 61–62.

\* cited by examiner

*Primary Examiner*—Terry D. Cunningham
*Assistant Examiner*—Quan Tra
(74) *Attorney, Agent, or Firm*—Mark A. Haynes; Haynes & Beffel LLP

(57) ABSTRACT

A triple well charge pump comprises a first transistor connected in a diode configuration having a first channel terminal, nominally the source, coupled to a first node, and the second channel terminal, nominally the drain, coupled to its gate and to a second node. A first capacitor has a first terminal coupled to the first node of the charge pump, and a second terminal adapted to receive a first clock signal. A second transistor has a first channel terminal coupled to the second node of the charge pump, and a second channel terminal coupled to its gate and to a third node. A second capacitor has a first terminal coupled to the second node, and a second terminal adapted to receive a second clock signal. The first and second transistors comprise a first region and a second region having a first conductivity type providing the first and second channel terminals respectively, a channel region in which the first and second regions are formed having a second conductivity type, and an isolation well having the first conductivity type in a semiconductor substrate. The first and second regions, the channel region and the isolation well form a parasitic bipolar junction transistor that has a threshold voltage. The channel region has a doping concentration establishing a threshold voltage for the MOS transistor which is less than the threshold voltage of the parasitic bipolar junction transistor. The clock signals have sloped rising and falling edges.

35 Claims, 7 Drawing Sheets

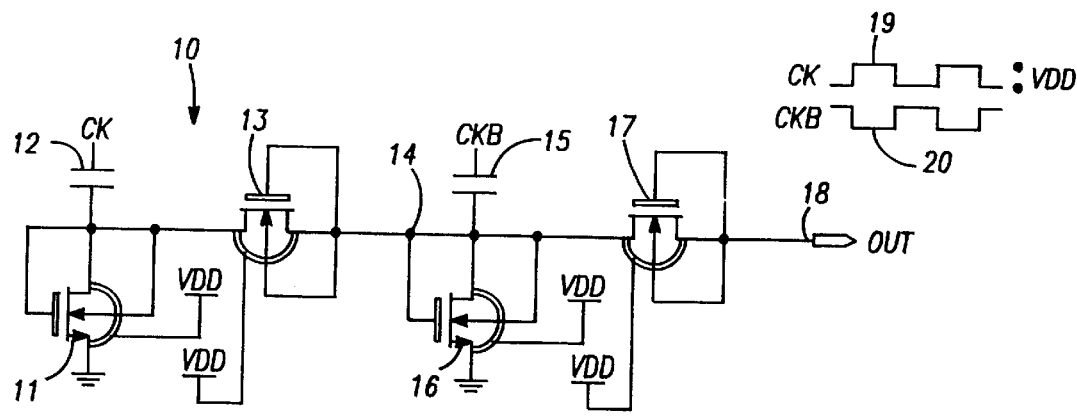
(PRIOR ART)
FIG.—1
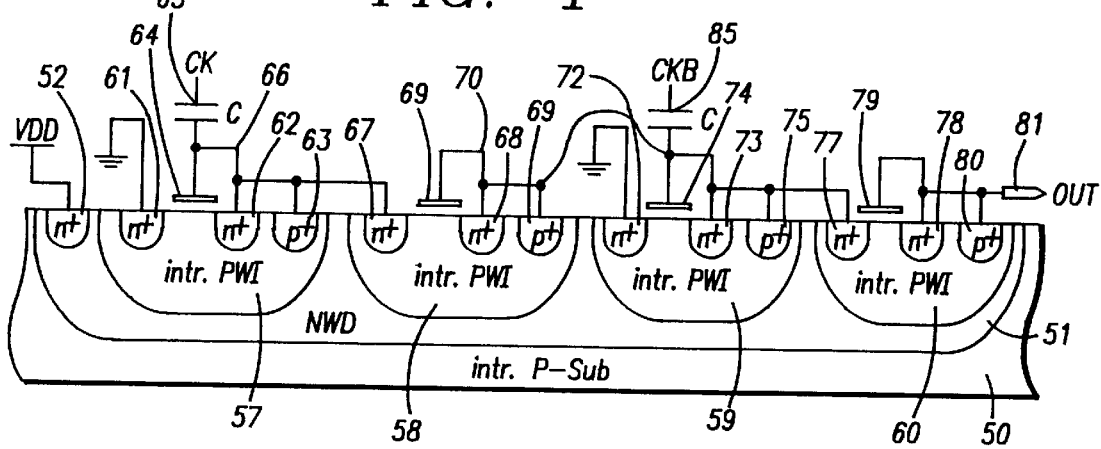
FIG.—2
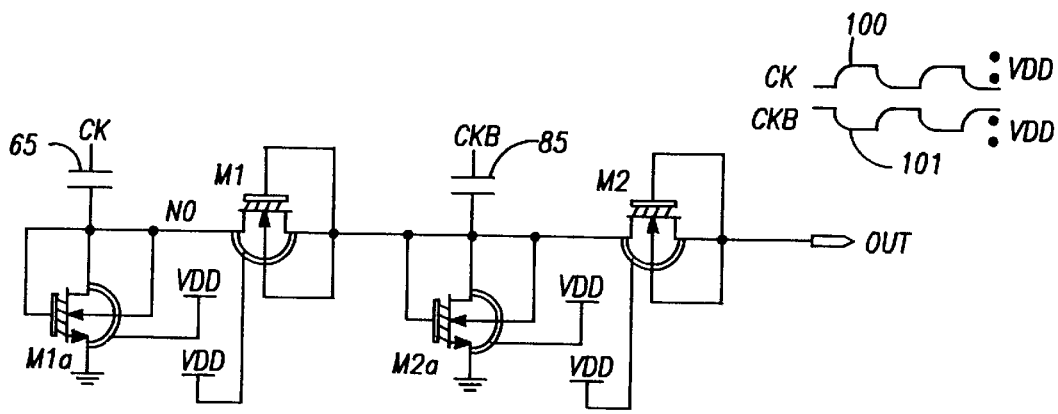
FIG.—3

FIG. —6

LOW THRESHOLD MOS TWO PHASE NEGATIVE CHARGE PUMP

BACKGROUND OF THE INVENTION

1. Field of the Invention

The present invention relates charge pump circuits, and to integrated circuits using charge pumps to produce on-chip voltages outside the range of the supply potentials.

2. Description of Related Art

Charge pump circuits are used to generate voltages on integrated circuits and elsewhere, which are higher than or more negative than input supply voltages. Charge pump circuits also called voltage booster circuits and voltage level shifting circuits, are becoming more important as low power applications of integrated circuits are designed to work with lower supply potentials. Thus, as integrated circuits work with supply potentials in the range of 2 to 3 volts or lower, and as circuits on the integrated circuits require operating voltages which are on the order of 5 volts or higher, or require operating voltages which are negative, charge pump circuits are becoming more important.

Representative prior art for charge pump circuits, and particularly negative charge pumps, are described in U.S. Pat. No. 5,489,870 entitled VOLTAGE BOOSTER CIRCUIT; U.S. Pat. No. 5,612,921 entitled LOW SUPPLY VOLTAGE NEGATIVE CHARGE PUMP; U.S. Pat. No. 5,502,629 entitled DC-DC CONVERTER; and in Choi, et al., FLOATING-WELL CHARGE PUMP CIRCUITS FOR SUB-2.0 v SINGLE POWER SUPPLY FLASH MEMORY, 1997 Symposium on VLSI Circuits Digest of Technical Papers, pages 61–62, Jun. 12–14, 1997. Also, prior art charge pump circuitry is disclosed in International Patent Application having Publication Number WO 98/16010 entitled TRIPLE WELL CHARGE PUMP which was owned at the time of invention and is currently owned by the same assignee as the present application.

As is disclosed in the International Application WO 98/16010, triple well transistors can be utilized in charge pumps to increase the efficiency. The triple well transistor comprises a MOS transistor which has source and drain regions of one conductivity type such as n-type, a channel well in which the source and drain regions are formed, of the opposite conductivity such as p-type, and an isolation well of the first conductivity type in which the channel well is formed. All of this is established in a substrate having the second conductivity type. The triple well transistor allows for isolation of the pump transistors from the substrate, as well as allowing for biasing of the channel regions of the transistors to reduce the body effect, and therefore reduce the threshold drop across the transistor. By reducing the threshold drop, efficiency of the charge pump is improved because less voltage is lost as the pumped charge is transferred from one stage to the next.

FIG. 1 illustrates a prior art negative charge pump using triple well n-type MOS transistors. In FIG. 1, an input node 10 is clamped to ground through a first triple well n-channel MOS (NMOS) transistor 11. The transistor 11 has its source, gate and channel well coupled to node 10. The source of transistor 11 is connected to ground. The isolation well is coupled to the supply potential VDD. Node 10 is also coupled across a capacitor 12 to a clock signal. A second transistor 13 has its source connected to node 10, and its gate, channel well, and drain coupled to node 14. The isolation well of transistor 13 is also connected to the supply potential VDD. Node 14 is connected through a capacitor 15 to a clock signal which is 180° out of phase with the clock signal applied to capacitor 12. Also, a clamp transistor 16 formed using a triple well NMOS device has its source connected to ground, and its gate, drain and channel well connected to node 14. The isolation well of transistor 16 is connected to the supply potential VDD. Finally, node 14 is connected to the source of a fourth transistor 17. The gate, drain and channel well are coupled to an output terminal 18. The isolation well is coupled to the supply potential VDD. The clock signals are illustrated at traces 19 and 20 in FIG. 1. Basically the transistors 13 and 17 are connected in a diode configuration. The isolation well is connected to VDD, or another potential between zero and the supply to potential to avoid a pn junction turn on between the isolation well and the substrate.

In operation, the node 10 is clamped to a voltage near a threshold above ground. When the clock signal CK on capacitor 12 transits from VDD to ground, node 10 is pushed negative by an amount near the absolute value of VDD. This back biases the clamp transistor 11, allowing node 10 to go negative. As node 10 goes negative, charge is transferred through transistor 13 to node 14. This pulls node 14 to a voltage below the bias point established by transistor 16. On the falling edge of the signal CKB across capacitor 15, node 14 is pushed even further negative, and the charge is transferred across transistor 17 to the output terminal 18.

One problem with a triple well MOS connected transistor of the type shown, is the formation of the parasitic NPN bipolar transistor between the n-diffusion of the source, the channel well which is p-type, and the isolation well which is n-type. In this case, the channel well acts as the base of the NPN transistor. The NPN transistor can turn on if the emitter formed by the source of the NMOS transistor falls to a level more than the NPN threshold less than the base. This causes current flow from the isolation well into the source of the NMOS transistor and decreases pump efficiency.

Thus, the parasitic NPN transistor in the charge transfer transistor 13 may experience a condition in which its emitter (the source of NMOS 13) is biased at a negative voltage after the falling edge of the clock CK while its collector (isolation well at VDD) and base (channel well at node 14) are at higher potentials. In this case, parasitic NPN transistor in the charge transfer device 13 turns on at the same time as or before the NMOS device 13 begins conducting charge from node 10 to node 14.

Accordingly, it is desirable to provide an efficient two phase charge pump, which is compact and suitable for use in integrated circuits in the generation of negative voltages.

SUMMARY OF THE INVENTION

The present invention provides a triple well charge pump which overcomes the inefficiencies of the prior art design. The charge pump comprises a first MOS transistor connected in a diode configuration having a first channel terminal, nominally the source, coupled to a first node, and the second channel terminal, nominally the drain, coupled to its gate and to a second node. A first capacitor has a first terminal coupled to the first node of the charge pump, and a second terminal adapted to receive a first clock signal. A second MOS transistor has a first channel terminal coupled to the second node of the charge pump, and a second channel terminal coupled to its gate and to a third node. A second capacitor has a first terminal coupled to the second node, and a second terminal adapted to receive a second clock signal. According to the present invention, the first and second MOS transistors comprise a first region and a second region having a first conductivity type providing the first and second channel terminals respectively, a channel region in which the first and second regions are formed having a second conductivity type, an isolation well having the first conductivity type in a semiconductor substrate of the second conductivity type. The first region, the channel region and the isolation well form a parasitic bipolar junction transistor that has a threshold voltage. The channel regions have doping concentrations establishing threshold voltages for the MOS transistors which are less than the threshold voltages of the parasitic bipolar junction transistors.

According to various aspects of the invention, the parasitic bipolar junction transistor has a threshold voltage of about 0.6 volts, and the first and second MOS transistors have lower threshold voltages. The lower threshold voltages are established according to one aspect of the invention by providing a doping concentration in the channel regions which is equal to or near the native doping concentration of the semiconductor substrate. According to yet another alternative aspect of the invention, the threshold voltage of the first and second transistors is about one third to two thirds of the threshold voltage of the parasitic bipolar junction transistors.

According to yet another aspect of the invention, at least a third and in some embodiments a fourth, triple well transistors are provided. A third and fourth triple well transistors provide bias points at the first and second nodes of the charge pump in a manner similar to transistors 11 and 16 of the prior art in FIG. 1. In a preferred embodiment of the present invention, the third and fourth transistors are formed such that the threshold voltages of the third and fourth transistors are less than the respective parasitic bipolar junction transistor thresholds as mentioned above with respect to the first and second transistors.

Further, according to other aspects of the invention, a first and second transistors comprise n-type MOS devices, or p-type MOS devices depending on the desired output voltage. Also, the first and second clock signals comprise respective pulse sequences which are out of phase. In a preferred system, the pulse sequences are about 180° out of phase. In yet another embodiment, the pulses in the first and second clock signals have respective sloped rising and falling edges.

According to yet other aspects of the present invention, an integrated circuit is provided including the charge pump described above on chip and utilized for producing an operating voltage on chip which is outside the prespecified range of the supply potential for which the chip is adapted.

Thus, because the threshold voltage of the triple well MOS devices is less than, and preferably about half of, the pn junction turn on voltage, the parasitic bipolar transistors will not turn on provided that the rising and falling time of the clock signal CK and CKB are controlled to prevent voltage spikes. In this case, pump efficiency is maintained, and a very efficient two phase charge pump is provided.

Other aspects and advantages of the present invention can be seen upon review of the figures, the detailed description and the claims which follow.

BRIEF DESCRIPTION OF THE FIGURES

FIG. 1 is a circuit diagram of a prior art two phase negative charge pump.

FIG. 2 is a cross section of the two phase negative charge pump of the present invention showing intrinsic doping in the channel regions.

FIG. 3 is a circuit diagram of the two phase charge pump according to the present invention.

DETAILED DESCRIPTION

Figure 4:
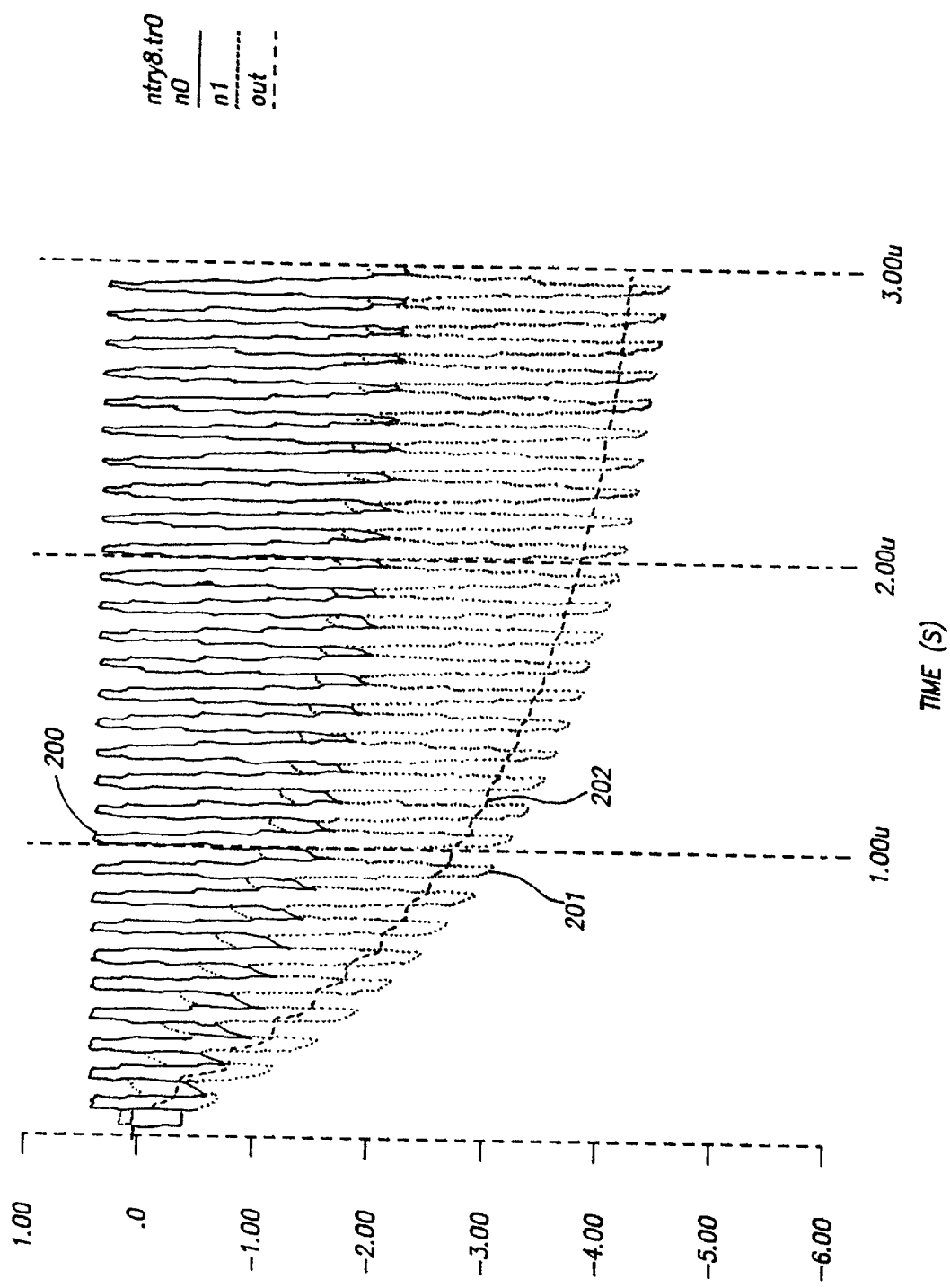
FIG. 4 is a timing diagram illustrating the voltages at the node N0, the node N1, and the node OUT in the circuit of FIG. 3.

A detailed description of embodiments of the present invention is provided with respect to FIGS. 2–10. FIG. 2 is a cross section of a triple well, two phase charge pump according to one embodiment of the present invention, and FIG. 3 is a circuit diagram of the charge pump of FIG. 2.

FIG. 2 provides a simplified cross section of the triple well charge pump using low threshold voltage (VT) NMOS transistors according to the present invention. In FIG. 2, a semiconductor substrate 50 is provided. Substrate 50 has an intrinsic p-type doping level. Typically, the substrate 50 is the bulk silicon of the chip. In alternatives, other bodies of semiconductor may be used, such as a silicon layer on an insulator. Inside the substrate 50 an isolation well 51 is formed. The isolation well 51 has an n-type doping and a contact 52 which is coupled to the supply potential VDD. The substrate 50 is coupled to ground.

The four transistor charge pump shown in FIG. 2 includes four transistors. Each of the transistors is formed in a respective channel well 57, 58, 59, 60. The doping concentration in the channel wells in this embodiment is at or near the intrinsic doping level of the substrate 50 (bulk silicon of chip), or otherwise doped, in order to establish a low VT for the MOS transistors.

A transistor (M1a of FIG. 3) has a first channel terminal 61 and a second channel terminal 62 formed in the channel well 57. These terminals act as the source and drain of the transistor M1a. The channel well 57 has a contact 63. Also, the transistor M1a has a gate 64. The gate 64, the channel terminal 62, the contact 63 to the channel well 57, and one terminal of the capacitor 65 are coupled to a first node 66. A next transistor (M1 of FIG. 3) consists of the channel terminals 67 and 68 in the channel well 58. The gate 69 of the transistor M1, the channel terminal 68 and the contact 69 to the channel well are coupled to a second node 70. The channel terminal 67 is coupled to the first node 66.

A next transistor (M2a of FIG. 3) in the charge pump is formed in the channel well 59. The first channel terminal 72, the second channel terminal 73, and the gate 74 establish the transistor M2a. The gate 74, channel terminal 73, and a contact 75 to the channel well 59 are coupled to the second node 70. The channel terminal 72 is coupled to ground. A capacitor 85 is connected from the second node 70 to receive a clock signal CKB, which is a sequence of pulses 180° out of phase with the clock signal CK received by capacitor 65.

A last transistor (M2 of FIG. 3) in the charge pump includes channel terminal 77 and channel terminal 78 formed in channel well 60. Channel terminal 77 is coupled to the second node 70. A gate 79 of the transistor M2, the channel terminal 78 and the contact 80 to the channel well 60 are all coupled to a third node 81.

The doping concentration of the channel wells 57, 58, 59 and 60 are established so that the threshold voltage of the parasitic bipolar transistor formed for example by the n-type channel terminal 67, the p-type channel well 58, and the n-type isolation well 51 do not turn on during operation of the device. Thus, the doping level establishes a threshold voltage of the MOS transistor which is less than the turn on voltage of the parasitic bipolar NPN transistor. In a preferred system, this is established by providing a p-type doping concentration in the channel wells which is near or at the intrinsic doping level of the p-type substrate. This will establish a threshold voltage in a preferred system of about 0.3 volts for the MOS device while the NPN transistor has a turn on voltage of about 0.6 volts or higher. Thus, the threshold voltage of the MOS device is in a range of about one third to two thirds of the threshold of the NPN bipolar device.

FIG. 3 is a schematic diagram of the charge pump shown in FIG. 2, and includes traces for the clock signals CK and CKB applied to the capacitors 65 and 85 respectively.

Thus, the charge pump comprises a first transistor M1 and second transistor M2. A third transistor M1a and a fourth transistor M2a provide biasing for the charge pump. Capacitor 65 and capacitor 85 are included. The first transistor M1 has its source coupled to node N0 and its drain, channel well and gate coupled to node N1. The second transistor M2 has its source coupled to the node N1, and its gate, channel well and drain coupled to the output node OUT. The third transistor M1a has its gate, drain and channel well coupled to the node N0 and its source coupled to ground. Likewise, the fourth transistor M2a has its gate, drain and channel well coupled to the node N1 and its source coupled to ground. The isolation wells (e.g. 51 of FIG. 2) of the four transistors M1, M1a, M2, M2a are coupled to the supply potential VDD in this example. The hatching on the gate of the transistors symbolizes the low threshold of the device, and particularly a low threshold which is preferably about one third to two thirds of the turn on voltage of the parasitic bipolar NPN junction transistor between the isolation well and the source of the transistors M1 and M2.

The clock signals CK on trace 100 and CKB on trace 101 have RC type, sloped rising and falling edges, and switch between about VDD and ground in the preferred embodiment. Furthermore, the clock signals comprise respective sequences of pulses which are about 180° out of phase with respect to one another. Thus, the rising edge of CK coincides substantially with the falling edge of CKB and vice versa. The rising and falling edges of the signals CK and CKB are sloped, or have an RC type shape. This prevents voltage spikes from causing the bipolar junction transistors to turn on during the transitions of the clock. If the clock rise or falls too fast, then the intrinsic triple well transistors M1 and M2 may not be able to discharge the charge fast enough from node N1 to node N0, or from node OUT to node N1, to prevent the pn junction turning on. For example, a voltage spike on node N1 may be larger than the voltage on node N0 by more than the threshold voltage of the parasitic NPN transistors for a short period of time. Thus, the rising and falling time of the clock signals CK and CKB are modified by the clock generator to prevent the pn junction from turning on during the transition. An alternative approach involves enlarging the sizes of transistors M1 and M2 so that the charge transfer characteristics are sufficient to prevent NPN turn on. However, practical systems will combine and trade off rising and falling edges of the clock signals with the sizes of transistors M1 and M2. Investigation to date suggests that the sizes of transistors M1 and M2 to prevent the unwanted turn on of the NPN devices will be too large for many applications of the charge pump. The proper rising and falling time for the clock signals will vary with the different processes used to manufacture the devices, the pump driving capability desired, the pump capacitance sizes, and the pump clock frequencies. These values can be determined by simulation using techniques known in the art.

FIGS. 4, 5, 6 and 7 illustrate the voltages on nodes N0, N1 and OUT in operation of the device. Review of these simulations can be used to understand the efficient operation of the two phase charge pump of FIG. 3. In FIG. 4, the voltage at node N0 is shown on trace 200, the voltage at node N1 is shown on trace 201, the voltage on the output node OUT is shown on trace 202. When the pump is initialized, the voltage on node N0 begins to fluctuate with the clock signal CK as driven across capacitor 65. This voltage will fluctuate between about a positive value of less than 0.5 volts and settling at about the threshold voltage of transistor M1a, and a negative voltage of about −2.3 volts for VDD of about 3 volts. The voltage on node N1 shown by trace 201 fluctuates in response to the clock signal CKB from a level, settling at about −2 volts, which is within about a threshold voltage of transistor M1 of the most negative value of the voltage on N0, and a voltage which is about VDD more negative (about −4.7 volts). The output voltage on node OUT is established at a level which is about a threshold drop of the transistor M2 less than the peak negative value of the voltage at node N1 settling at about −4.4 volts.

Figure 5:
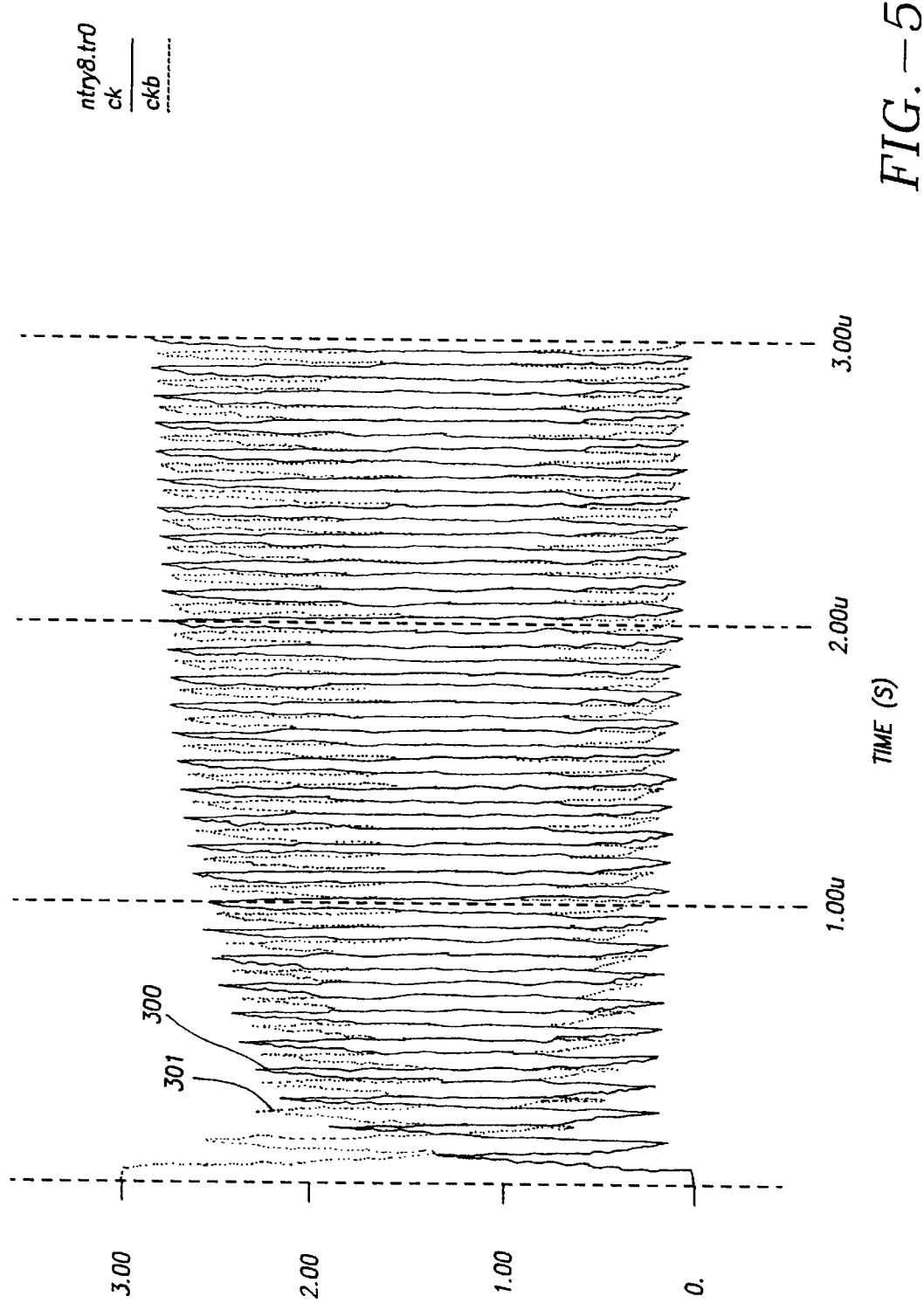
FIG. 5 is a timing diagram illustrating the clock signals CK and CKB according to one embodiment of the present invention.

The clock signals CK and CKB according to the simulation of FIG. 4 are illustrated in FIG. 5. The first clock signal CK is illustrated on trace 300. The clock signal CKB is illustrated on trace 301. These signals are about 180° out of phase with respect to one another and have sloped rising and falling edges. These clock signals after initialization stabilize at a sequence of pulses which range between about 0 volts and about the supply potential VDD about 3 volts.

Figure 6:
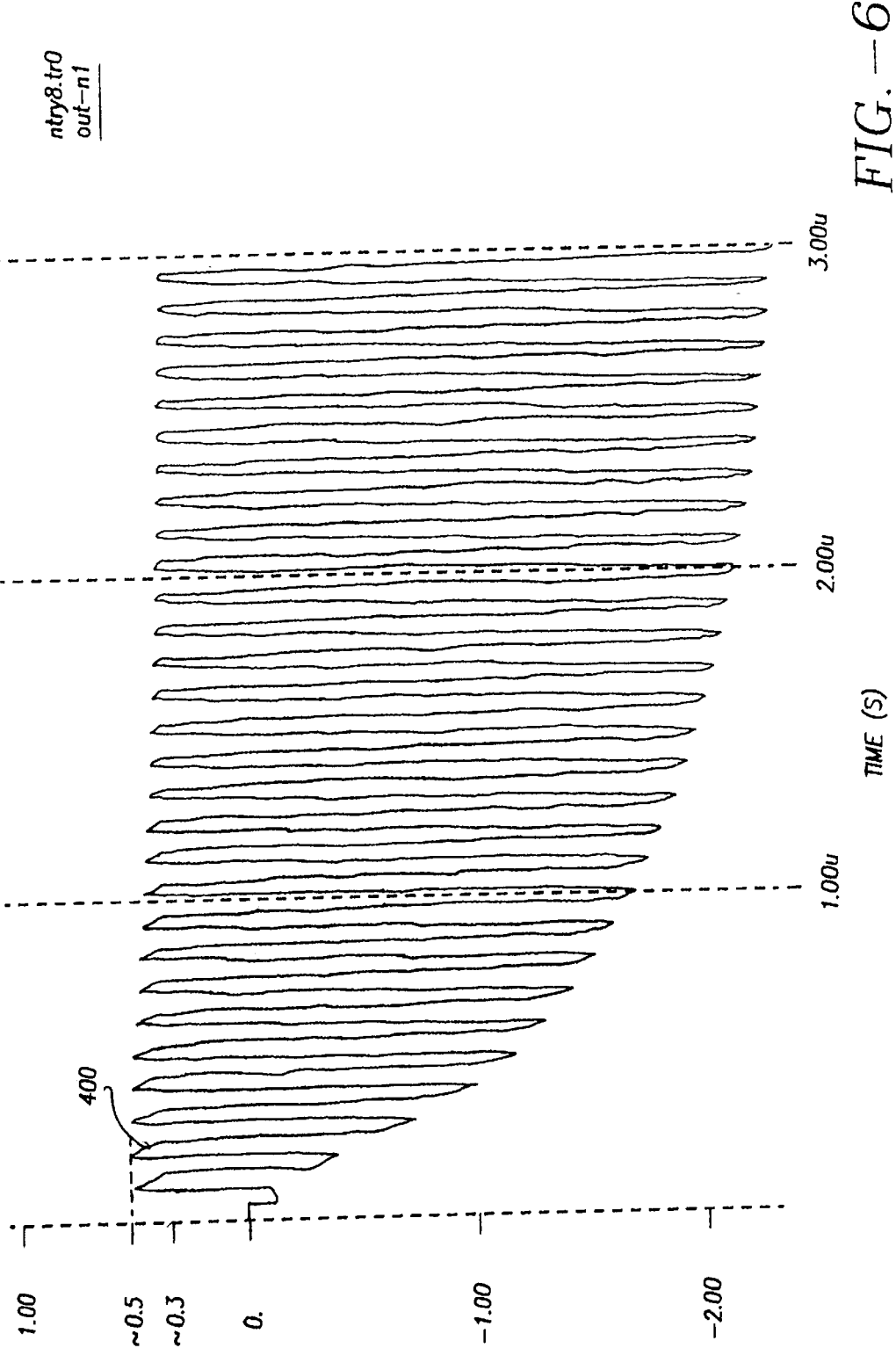
FIG. 6 illustrates the difference between the output voltage and the voltage at node N1 for the circuit of FIG. 3.

FIG. 6 illustrates the difference between the voltage on the output node OUT and the node N1 in the circuit of FIG. 3. This voltage difference is illustrated on trace 400. The difference between the output potential and the voltage at node N1 is never greater than about 0.5 volts in the simulation. The voltage difference stabilizes at a level which is about 0.3 volts maximum positive value, corresponding to the threshold voltage of transistor M2. This ensures that the NPN junction transistor having a threshold about 0.6 to 0.7 volts does not turn on during operation of the charge pump.

Figure 7:
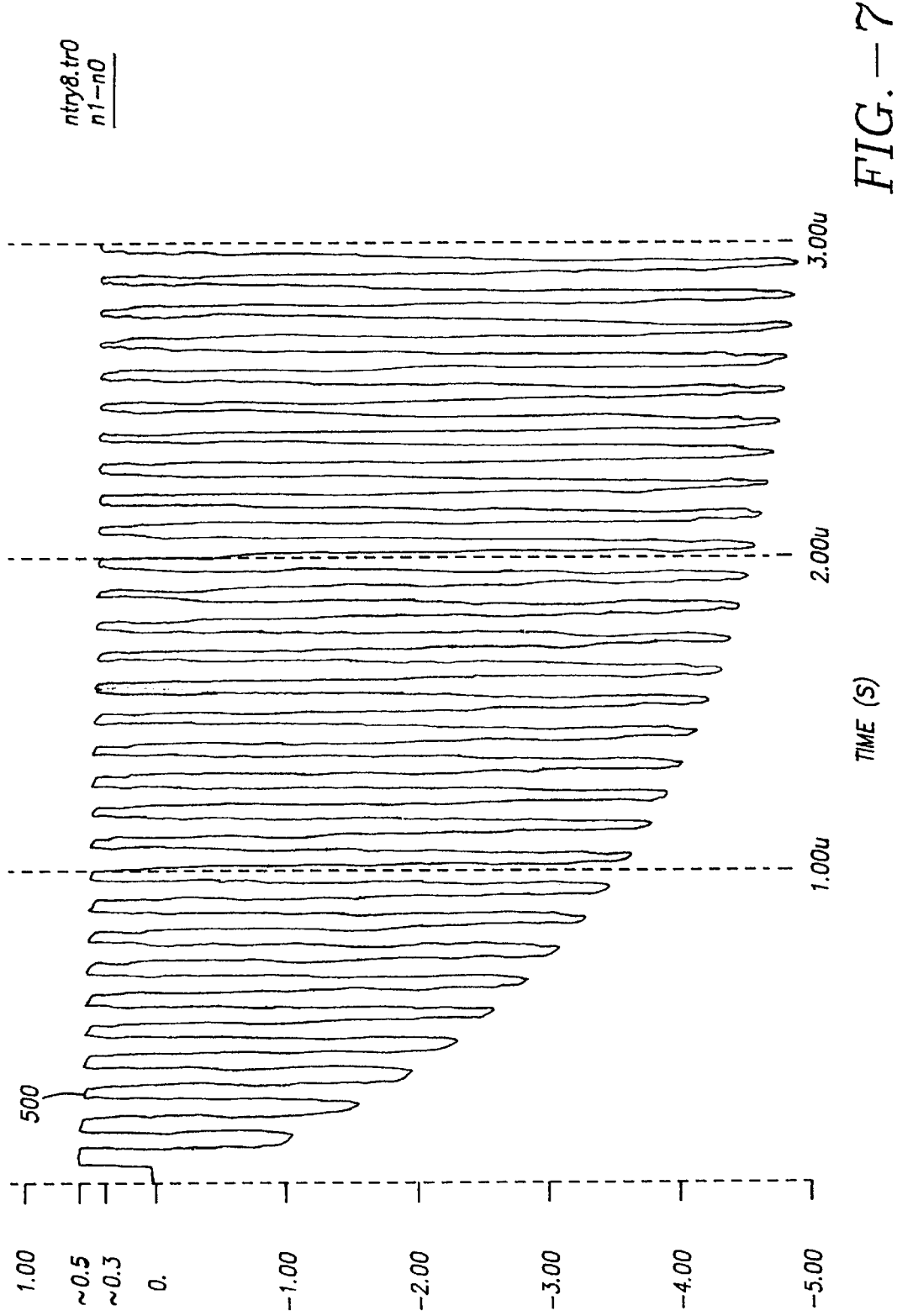
FIG. 7 illustrates the difference between the voltage at node N1 and the voltage at node N0 for the circuit of FIG. 3.

FIG. 7 illustrates the voltage difference between the node N1 and the node N0 on trace 500. This voltage trace is similar to that shown for FIG. 6. However, the voltage drop achieves greater negative levels than the difference between OUT and N1. Also, it can be seen that the difference between node N1 and N0 is never greater than a positive 0.5 volts during startup of the device, and stabilizes at a level of about positive 0.3 volts corresponding to the threshold voltage of the transistor M1.

Figure 8:
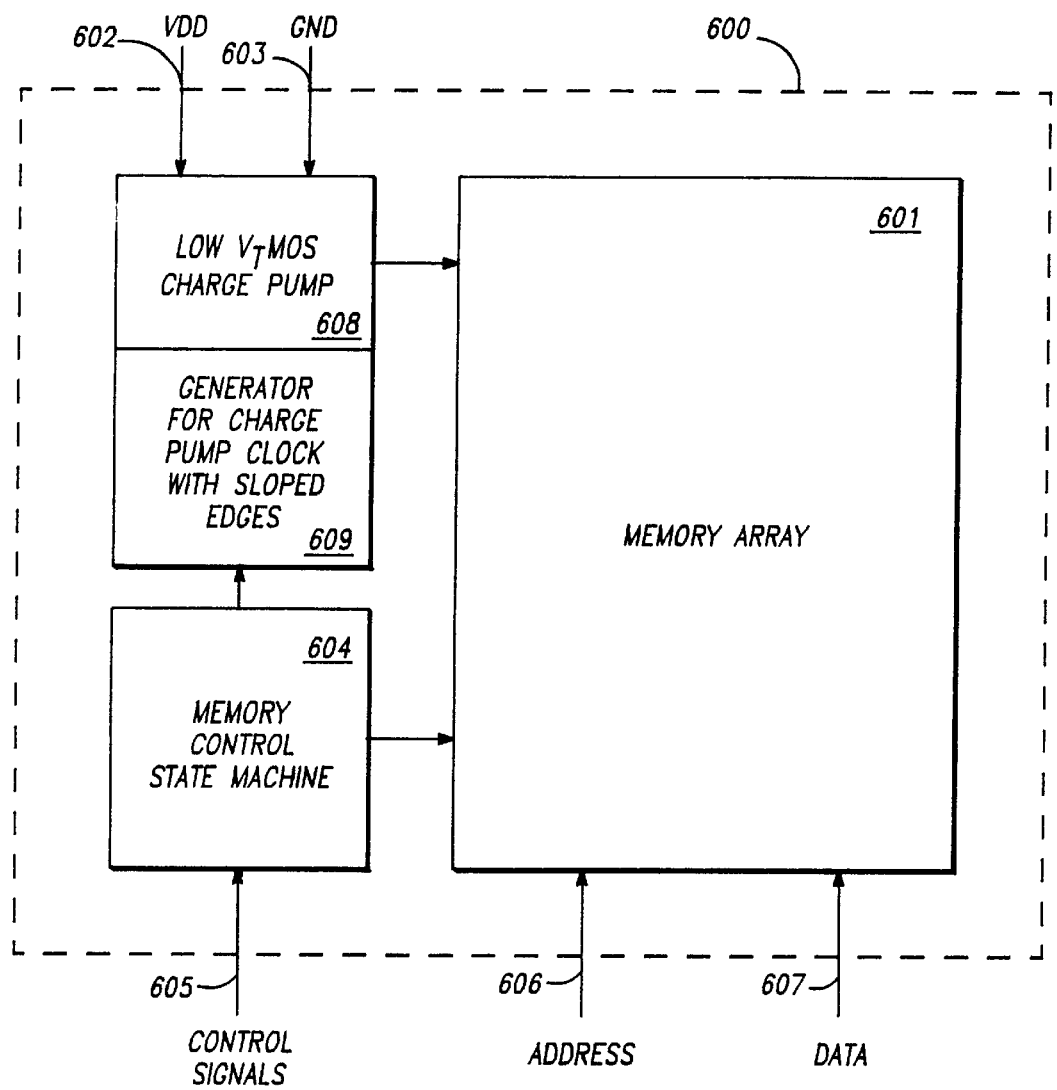
FIG. 8 is a simplified block diagram of an integrated circuit utilizing the low VT MOS charge pump of the present invention.

FIG. 8 provides a simplified diagram of an integrated circuit utilizing the low VT MOS charge pump of the present invention. The integrated circuit 600 includes a semiconductor substrate. A memory array 601 is included on the device which utilizes operating voltages which are outside the prespecified range of the supply potential normally applied to the device at supply terminals 602 and 603, which are adapted to receive a supply potential VDD and ground.

The integrated circuit in this example includes a memory control state machine 604 which establish various operational modes for the memory array. Input signals include control signals 605 applied to the control state machine 604, address signals 606 applied to the memory array circuitry, and data signals 607 also applied to the memory array 601. According to the present invention, there is a low threshold voltage MOS charge pump 608 included on the device which is adapted to receive the supply potentials VDD and ground. Also, a generator 609 for a charge pump clock with sloped edges is provided on the chip.

FIG. 8 is representative of a wide variety of integrated circuits which include on-chip circuitry that utilizes operational voltages outside the pre-specified range of the supply potential. Memory devices such as flash memory devices are one class of integrated circuits according to the present invention.

The examples illustrated in the present invention include two stages and bias transistors M1a and M2a. Some of the bias transistors could be elimnated in various embodiments if the setup time is not a critical factor for the pumps. Also, there may be additional stages in the charge pump with or without bias transistors in order to provide greater negative values. Also alternative systems could be implemented using p-type transistors for producing positive output voltages.

Figure 9:
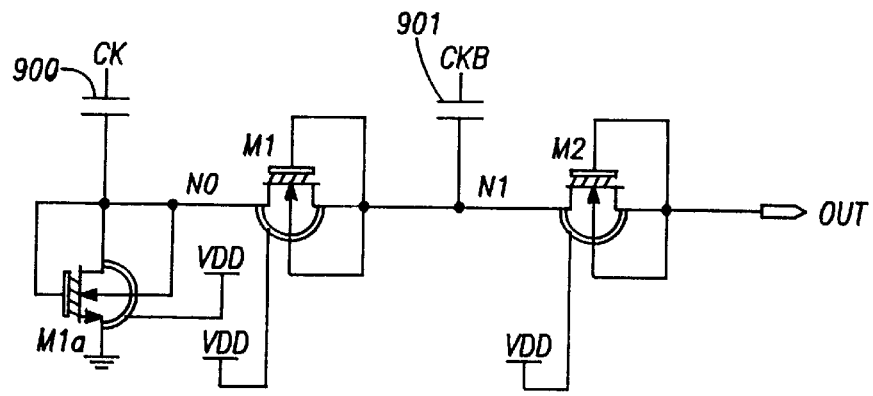
FIG. 9 is a circuit diagram of an alternative implementation of a charge pump according to the present invention.

FIG. 9 illustrates an alternative embodiment of a charge pump using low threshold voltage transistors M1, M2, and M1a. This embodiment is similar to that shown in FIG. 3, except that the transistor M2a of FIG. 3 has been removed. The similar nodes have been given like reference designations and are not described again here. The clock signal CK is supplied through the capacitor 900 to node N0. The clock signal CKB is supplied to capacitor 901 to the node N1.

Figure 10:
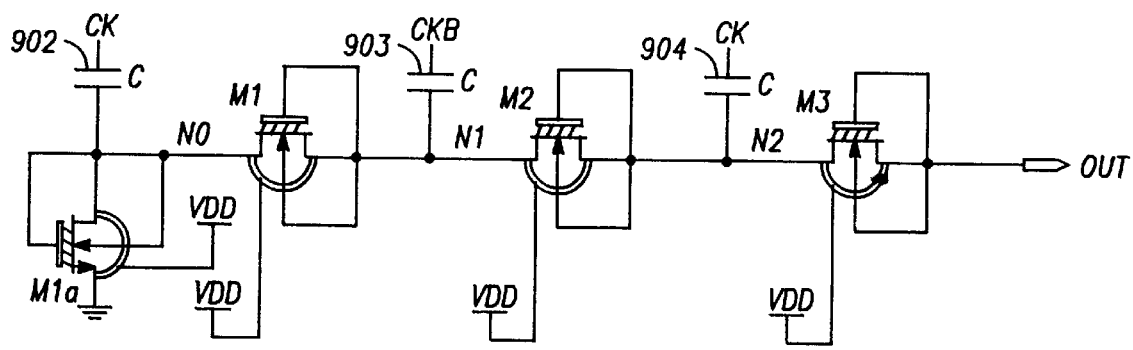
FIG. 10 is a circuit diagram of yet another alternative configuration of a charge pump according to the present invention.

FIG. 10 illustrates yet another alternative embodiment of a charge pump according to the present invention including more than two stages. Thus, the embodiment of FIG. 10 includes transistors M1, M2 and M1a which are interconnected in the same manner as the transistors in FIG. 9. The channel terminal of tansistor M2 coupled to the output on FIG. 9 is connected to node N2 of FIG. 10. Node N2 is connected to the source of the low threshold voltage transistor M3. The gate and drain and channel well of transistor M3 are coupled together and to the output node of the charge pump. The isolation well is connected to the supply potential VDD. The clock signal CK is supplied through capacitor 902 to the node N0, and through capacitor 904 to the node N2. The clock signal CKB is supplied through capacitor 903 to the node N1.

FIG. 10 illustrates a three stage charge pump. Additional stages can be connected in series. Also, bias transistors can be added to the nodes N1 and N2, in a manner similar to the connection of bias transistor M2a of FIG. 3 and its connection to node N1.

Overall, an efficient, compact, two phase charge pump has been provided according to the present invention which is suitable for use in a wide class of integrated circuit devices.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A charge pump comprising:

a first transistor having a gate, a first channel terminal coupled to a first node, and a second channel terminal coupled to its gate and a second node;

a first capacitor having a first terminal coupled to the first node, and a second terminal adapted to receive a first clock signal;

a second transistor having a gate, a first channel terminal coupled to the second node, and a second channel terminal coupled to its gate and to a third node; and a second capacitor having a first terminal coupled to the second node, and a second terminal adapted to receive a second clock signal;

wherein the first and second transistors respectively comprise a first region and a second region having a first conductivity type providing the first and second channel terminals respectively, a channel region in which the first and second regions are formed having a second conductivity type, the channel region being formed in an isolation well having the first conductivity type and an isolation well having the first conductivity type in a semiconductor substrate having the second conductivity type; the first and second regions, the channel region and the isolation well forming a parasitic bipolar junction transistor having a threshold voltage, and wherein the channel region has a doping concentration establishing a threshold voltage of the respective transistor less than the transistor voltage of the parasitic bipolar junction transistor.

2. The charge pump of claim 1, wherein the threshold voltage of the parasitic bipolar junction transistor is about 0.6 volts.

3. The charge pump of claim 1, wherein the semiconductor substrate has a native doping concentration of the second conductivity type, and wherein the doping concentration in the channel region is equal to or near the native doping concentration.

4. The charge pump of claim 1, wherein the threshold voltage of the first and second transistors is about one third to two thirds of the threshold voltage of the parasitic bipolar junction transistor.

5. The charge pump of claim 1, including:

a third transistor having a gate, a first channel terminal coupled to the first node, and a second channel terminal coupled to a bias potential.

6. The charge pump of claim 5, including:

a fourth transistor having a gate, a first channel terminal coupled to the second node, and a second channel terminal coupled to the bias potential.

7. The charge pump of claim 1, wherein the first conductivity type comprises n-type.

8. The charge pump of claim 1, wherein the first conductivity type comprises p-type.

9. The charge pump of claim 1, wherein the first clock signal and second clock signal comprise respective pulse sequences.

10. The charge pump of claim 9, wherein the pulses in the first and second clock signals have respective sloped rising and falling edges.

11. The charge pump of claim 1, wherein the first clock signal and second clock signal comprise pulses out-of-phase by about 180 degrees.

12. The charge pump of claim 10, wherein the pulses in the first and second clock signals have respective sloped rising and falling edges.

13. A charge pump comprising:
a first transistor having a gate, a first channel terminal coupled to a first node, and a second channel terminal coupled to its gate and a second node;
a first capacitor having a first terminal coupled to the first node, and a second terminal adapted to receive a first clock signal;
a second transistor having a gate, a first channel terminal coupled to a second node, and a second channel terminal coupled to its gate and to a third node; and
a second capacitor having a first terminal coupled to the second node, and a second terminal adapted to receive a second clock signal;
a third transistor having a gate, a first channel terminal coupled to the first node, and a second channel terminal coupled to a bias potential;
wherein the first, second and third transistors respectively comprise a first region and a second region having a first conductivity type providing the first and second channel terminals respectively, a channel region in which the first and second regions are formed having a second conductivity type, the channel region being formed in an isolation well having the first conductivity type in a semiconductor substrate having the second conductivity type; the first and second regions, the channel region and the isolation well forming a parasitic bipolar junction transistor having a threshold voltage, and wherein the channel region has a doping concentration establishing a threshold voltage of the respective transistor less than the threshold voltage of the parasitic bipolar junction transistor.

14. The charge pump of claim 13, including:
a fourth transistor having a gate, a first channel terminal coupled to the second node, and a second channel terminal coupled to the bias potential.

15. The charge pump of claim 13, wherein the threshold voltage of the parasitic bipolar junction transistor is about 0.6 volts.

16. The charge pump of claim 13, wherein the semiconductor substrate has a native doping concentration of the second conductivity type, and wherein the doping concentration in the channel region is equal to or near the native doping concentration.

17. The charge pump of claim 13, wherein the threshold voltage of the first, second, and third transistors is about one third to two thirds the threshold voltage of the parasitic bipolar junction transistor.

18. The charge pump of claim 13, wherein the first conductivity type comprises n-type.

19. The charge pump of claim 13, wherein the first conductivity type comprises p-type.

20. The charge pump of claim 13, wherein the first clock signal and second clock signal comprise respective pulse sequences.

21. The charge pump of claim 20, wherein the pulses in the first and second clock signals have respective sloped rising and falling edges.

22. The charge pump of claim 13, wherein the first clock signal and second clock signal comprise respective pulse sequences out-of-phase by about 180 degrees.

23. The charge pump of claim 22, wherein the pulses in the first and second clock signals have respective sloped rising and falling edges.

24. An integrated circuit comprising:
a semiconductor substrate;
circuitry on the substrate adapted to operate in response to a operating voltage;
a supply voltage terminal and a ground terminal on the substrate, adapted to receive a supply voltage within a prespecified range, the operating voltage outside of the prespecified range; and
a charge pump coupled to the supply voltage terminal and the ground terminal including
a clock circuit producing first and second clock signals;
a first transistor having a gate, a first channel terminal coupled to a first node, and a second channel terminal coupled to its gate and a second node;
a first capacitor having a first terminal coupled to the first node, and a second terminal adapted to receive a first clock signal;
a second transistor having a gate, a first channel terminal coupled to a second node, and a second channel terminal coupled to its gate and to a third node; and
a second capacitor having a first terminal coupled to the second node, and a second terminal adapted to receive a second clock signal;
a third transistor having a gate, a first channel terminal coupled to the first node, and a second channel terminal coupled to a bias potential;
wherein the first, second and third transistors respectively comprise a first region and a second region having a first conductivity type providing the first and second channel terminals respectively, a channel region in which the first and second regions are formed having a second conductivity type, the channel region being formed in an isolation well having the first conductivity type in a semiconductor substrate having the second conductivity type; the first and second regions, the channel region and the isolation well forming a parasitic bipolar junction transistor having a threshold voltage, and wherein the channel region has a doping concentration establishing a threshold voltage of the respective transistor less than the threshold voltage of the parasitic bipolar junction transistor.

25. The integrated circuit of claim 24, wherein the threshold voltage of the parasitic bipolar junction transistor is about 0.6 volts.

26. The integrated circuit of claim 24, wherein the semiconductor substrate has a native doping concentration of the second conductivity type, and wherein the doping concentration in the channel region is equal to or near the native doping concentration.

27. The integrated circuit of claim 24, wherein the threshold voltage of the first and second transistors is about one third to two thirds the threshold voltage of the parasitic bipolar junction transistor.

28. The integrated circuit of claim 24, including:
a fourth transistor having a gate, a first channel terminal coupled to the second node, and a second channel terminal coupled to the bias potential.

29. The integrated circuit of claim 28, wherein the fourth transistor comprises a first region and a second region having a first conductivity type providing the first and second channel terminals respectively, a channel region in which the first and second regions are formed having a second conductivity type, an isolation well having the first conductivity type in a semiconductor substrate having the second conductivity type, and in which the channel region is formed, the first and second regions, the channel region and the isolation well forming a parasitic bipolar junction transistor having a threshold voltage, and wherein the channel region has a doping concentration establishing a threshold voltage of the respective transistor less than the threshold voltage of the parasitic bipolar junction transistor.

30. The integrated circuit of claim 24, wherein the first conductivity type comprises n-type.

31. The integrated circuit of claim 24, wherein the first conductivity type comprises p-type.

32. The integrated circuit of claim 24, wherein the first clock signal and second clock signal comprise respective pulse sequences.

33. The integrated circuit of claim 32, wherein the pulses in the first and second clock signals have respective sloped rising and falling edges.

34. The integrated circuit of claim 24, wherein the first clock signal and second clock signal comprise pulses out-of-phase by about 180 degrees.

35. The integrated circuit of claim 34, wherein the pulses in the first and second clock signals have respective sloped rising and falling edges.

* * * * *